United States Patent [19]
Carlson et al.

[11] Patent Number: 6,130,779
[45] Date of Patent: Oct. 10, 2000

[54] NEAR FIELD MAGNETO-OPTICAL HEAD MADE USING WAFER PROCESSING TECHNIQUES

[75] Inventors: Carl J. Carlson, Pleasanton; Joseph Miceli, Jr., Saratoga; Hong Chen, Cupertino; Chuan He, Fremont; Charles C-K Cheng, Cupertino; Ross W Stovall, Fremont, all of Calif.

[73] Assignee: Read-Rite Corporation, Fremont, Calif.

[21] Appl. No.: 09/111,098

[22] Filed: Jul. 6, 1998

[51] Int. Cl.[7] .............................. G02B 5/18; G11B 5/27; G11B 7/00
[52] U.S. Cl. .......................... 359/566; 360/114; 369/112
[58] Field of Search .............................. 369/44.19, 44.21, 369/13; 360/112, 114, 103; 359/566

[56] References Cited

U.S. PATENT DOCUMENTS

| | | | |
|---|---|---|---|
| 5,422,870 | 6/1995 | Kojima et al. | 369/112 |
| 5,497,359 | 3/1996 | Mamin et al. | 369/112 |
| 5,590,115 | 12/1996 | Kubo | 369/290 |
| 5,761,005 | 6/1998 | McKay et al. | 360/104 |
| 5,784,343 | 7/1998 | Watanabe et al. | 360/114 |
| 5,850,375 | 12/1998 | Wilde et al. | 369/112 |
| 5,886,959 | 3/1999 | Bischoff et al. | 360/114 |

Primary Examiner—Cassandra Spyrou
Assistant Examiner—Jennifer Winstedt
Attorney, Agent, or Firm—Robert King; Samuel A. Kassatly

[57] ABSTRACT

The method of making and self-aligning a magneto-optical head at a wafer level is as follows: A flat optical substrate is molded or heat pressed in batches as a wafer level to form the desired lens shapes. Coil cavities or depressions are simultaneously formed with the lens to accommodate the coil assembly. Conductive plugs are formed in proximity to the cutting lines, for wire bonding attachment to the coil. The plugs are filled with a conductive material such as copper. The plugs do not extend through the entire depth of the optical wafer, thus further facilitating the mass production of the integrated heads. The slider body wafer is formed from silicon or other appropriate material. The slider body wafer and the lens/coil wafer are bonded. Coils and pedestals are formed on the lens / coil plate using thin-film processing techniques. Reflective surfaces are deposited on the bottom surface of the substrate, opposite the lens. The mirror material around the pedestal areas and plugs is masked and removed. An alumina layer is then deposited to define the air bearing surface and the pedestal. Yokes are then formed by means of lithography and plating in the base and sides of the depressions to assume a desired shape. A series of alternating insulating layers and conductive coil layers is formed. A protective layer seals the coil assembly, and is lapped to correct the lens thickness and to provide proper focal plane.

37 Claims, 19 Drawing Sheets

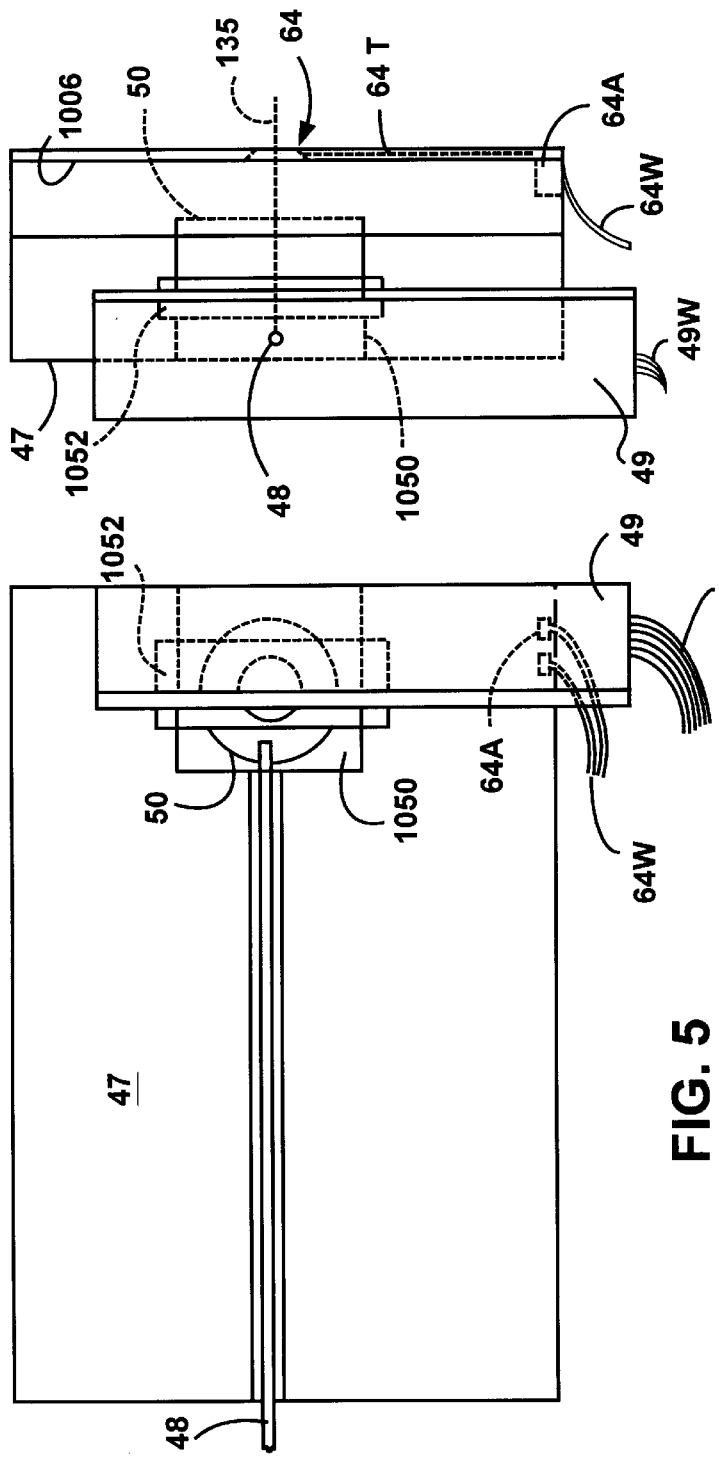
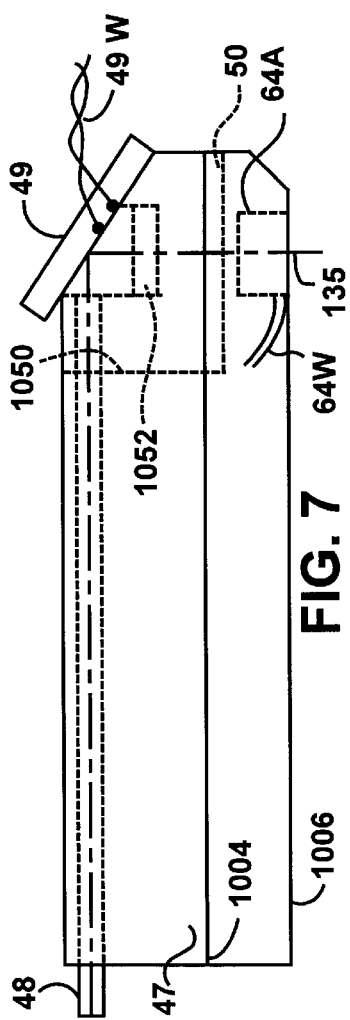
FIG. 5
FIG. 6
FIG. 7

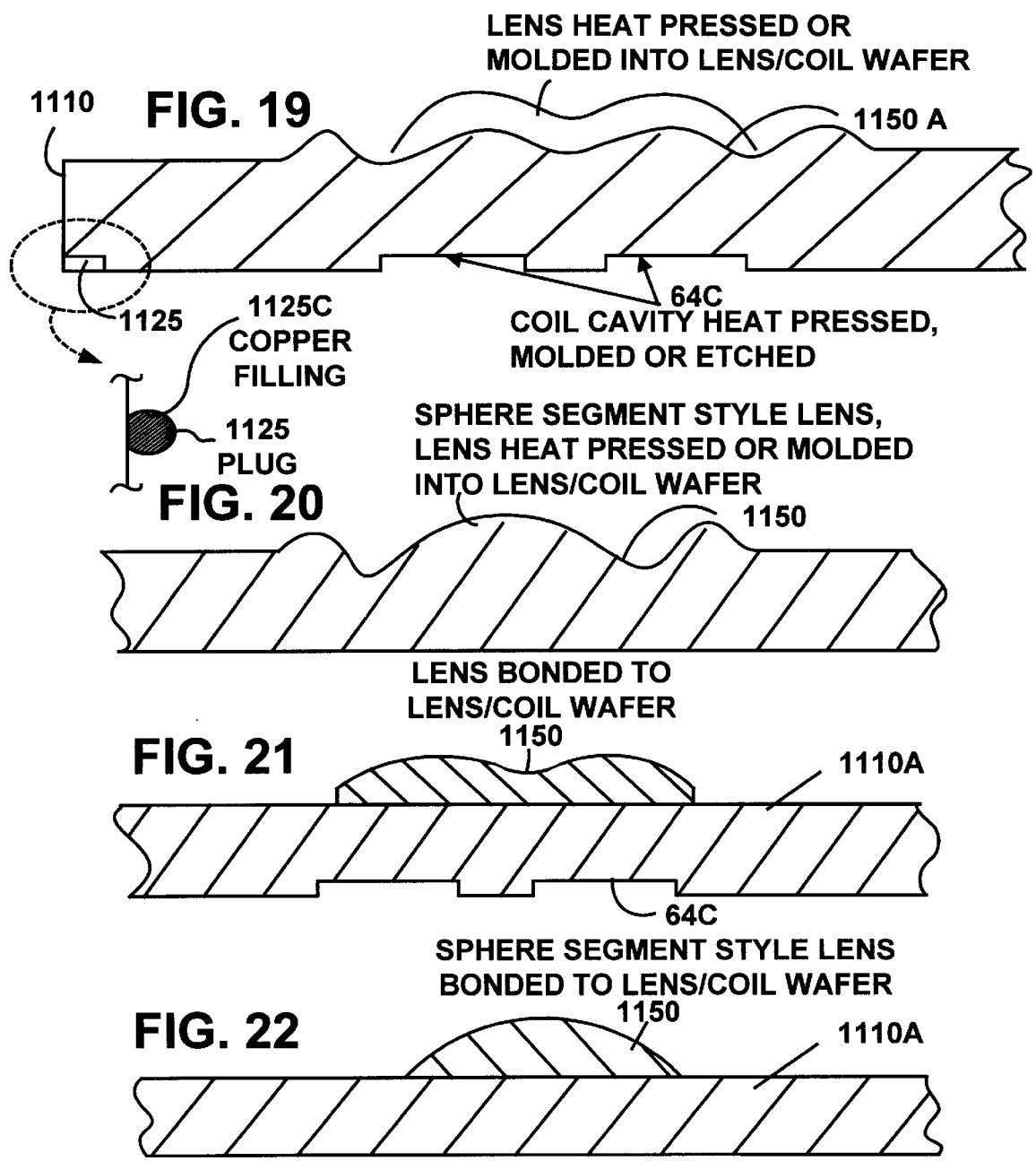

NEAR FIELD MAGNETO-OPTICAL HEAD MADE USING WAFER PROCESSING TECHNIQUES

BACKGROUND OF THE INVENTION

1. Field of the Invention

The present invention relates in general to data storage devices, and it particularly relates to methods for mass producing a disk drive head with a numerical aperture (NA) catadioptric focusing device, using wafer processing techniques. The present invention further relates to a catadioptric focusing device with high numerical aperture (NA) for use in data storage systems such as optical and magneto-optical (MO) disk drives.

2. Description of Related Art

In a MO storage system, a thin film read/write head includes an optical assembly for directing and focusing an optical beam, such as a laser beam, and an electro-magnetic coil that generates a magnetic field for defining the magnetic domains in a spinning data storage medium or disk. The head is secured to a rotary actuator magnet and a voice coil assembly by a suspension and an actuator arm positioned over a surface of the disk. In operation, a lift force is generated by the aerodynamic interaction between the head and the disk. The lift force is opposed by equal and opposite spring forces applied by the suspension such that a predetermined flying height is maintained over a full radial stroke of the rotary actuator assembly above the surface of the disk.

A significant concern with the design of the MO head is to increase the recording or areal density of the disk. One attempt to achieve objective is to reduce the spot size of the light beam on the disk. The diameter of the spot size is generally proportional to the numerical aperture (NA) of an objective lens forming part of the optical assembly, and inversely proportional to the wavelength of the optical beam. As a result, the objective lens is selected to have a large NA. However, objective lenses with a large NA increase the spot aberration on the disk, thus adversely affecting the MO head performance.

Another concern related to the manufacture of MO heads is the extreme difficulty and high costs associated with the mass production of these heads, particularly where optical and electro-magnetic components are assembled to a slider body, and aligned for optimal performance.

SUMMARY OF THE INVENTION

One aspect of the present invention is to satisfy the long felt, and still unsatisfied need for a near-field optical or MO disk data storage system that uses a catadioptric focusing device or lens with a high numerical aperture (NA), which does not introduce significant spot aberration on the disk.

Another aspect of the present invention is to provide a focusing device that has generally flat surfaces that act as reference surfaces and facilitate its manufacture and its assembly to the head.

The method of making and self-aligning the head at a wafer level is as follows: A flat optical substrate is molded or heat pressed in batches as a wafer level to form the desired lens shapes. Coil cavities or depressions are simultaneously formed with the lens to accommodate the coil assembly. Conductive plugs are formed in proximity to the cutting lines, for wire bonding attachment to the coil. The plugs are filled with a conductive material such as copper. The plugs do not extend through the entire depth of the optical wafer, thus further facilitating the mass production of the integrated heads. The slider body wafer is formed from silicon or other appropriate material. The slider body wafer and the lens/coil wafer are bonded. Coils and pedestals are formed on the lens / coil plate using thin-film processing techniques. Reflective surfaces are deposited on the bottom surface of the substrate, opposite the lens. The mirror material around the pedestal areas and plugs is masked and removed. An alumina layer is then deposited to define the air bearing surface and the pedestal. Yokes are then formed by means of lithography and plating in the base and sides of the depressions to assume a desired shape. A series of alternating insulating layers and conductive coil layers is formed. A protective layer seals the coil assembly, and is lapped to correct the lens thickness and to provide the proper focal plane.

The focusing device includes an incident surface, a reflective surface, a focal pedestal, and a body. The incident surface is generally flat and is comprised of a central diffractive, optically transmissive surface and a peripheral surface. In one embodiment, the peripheral surface is comprised of a reflective-diffractive surface, or alternatively, a reflective-kinoform phase profile.

In use, an incident optical beam, such as a laser beam impinges upon the central surface, and is diffracted thereby. The incident laser beam can be collimated, convergent or divergent. The laser beam passes through the transparent body, and impinges upon the reflective surface. The laser beam is then reflected by the reflective surface, through the body, unto the peripheral surface. The laser beam is reflected and either diffracted or refracted by the peripheral surface, as a focused beam, through the body, and is focused in a focal point located at, or in close proximity to an edge of the focal pedestal. The focal point is located in very close proximity to the disk such that a localized evanescent field or light interacts with disk, enabling data to be transduced to and from the disk.

BRIEF DESCRIPTION OF THE DRAWINGS

The features of the present invention and the manner of attaining them, will become apparent, and the invention itself will be understood by reference to the following description and the accompanying drawings, wherein:

FIG. 5 is a top plan view of the head of FIG. 3, shown assembled to a reflective surface (i.e., mirror), a quarter-wave plate, an optical fiber, coil and mirror wires, and the lens coil plate of FIG. 4;

FIG. 6 is a front elevational view of the head of FIG. 5, further illustrating a coil forming part of the lens / coil plate of FIG. 4;

FIG. 7 is a side elevational view of the head of FIGS. 5 and 6;

FIGS. 12 through 22 illustrate the process of manufacturing the head of the present invention.

Similar numerals in the drawings refer to similar or identical elements. It should be understood that the sizes of the different components in the figures may not be in exact proportion, and are shown for visual clarity and for the purpose of explanation.

DETAILED DESCRIPTION OF THE INVENTION

Figure 1:
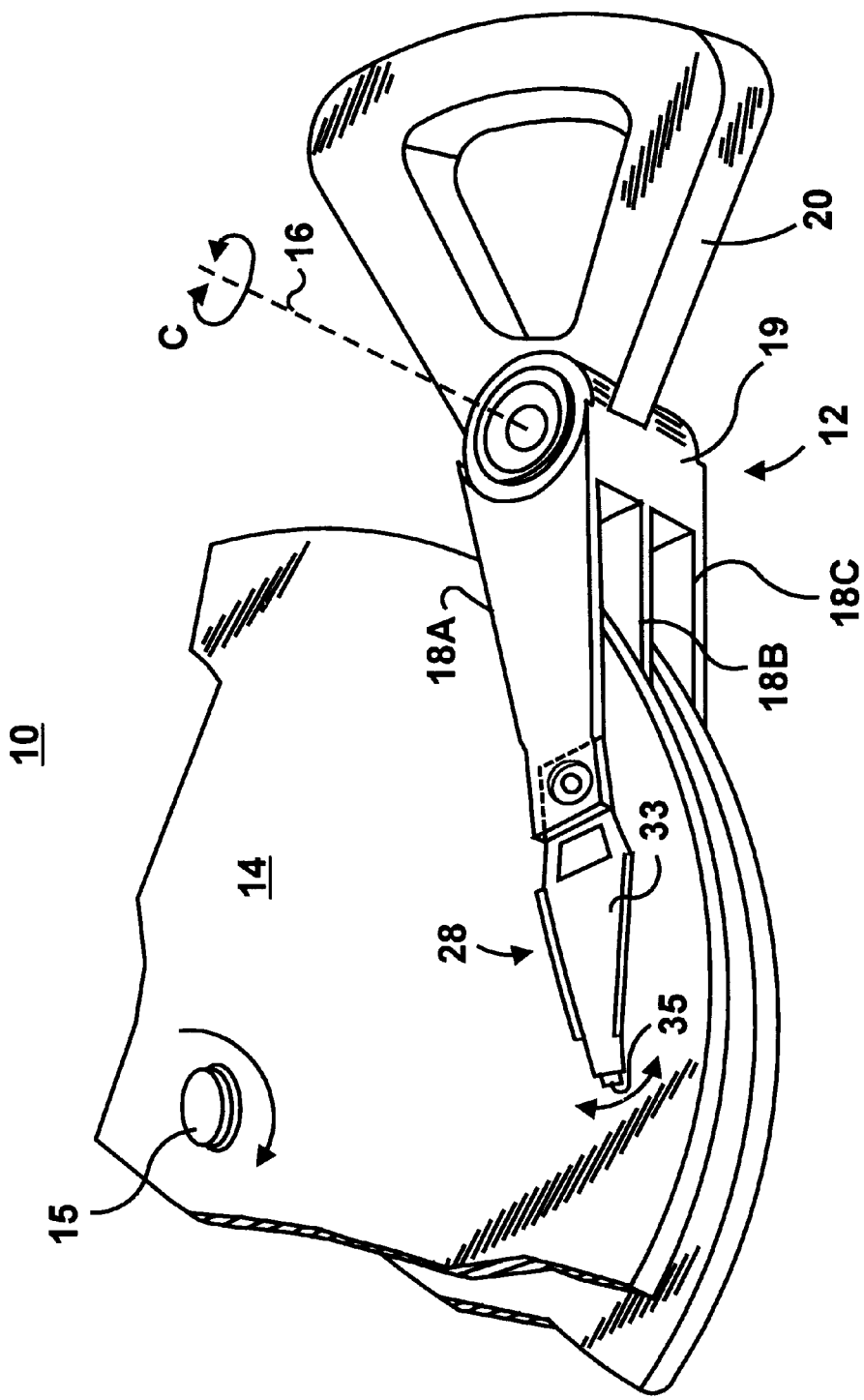
FIG. 1 is a fragmentary perspective view of a data storage system utilizing a read/write head according to the invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
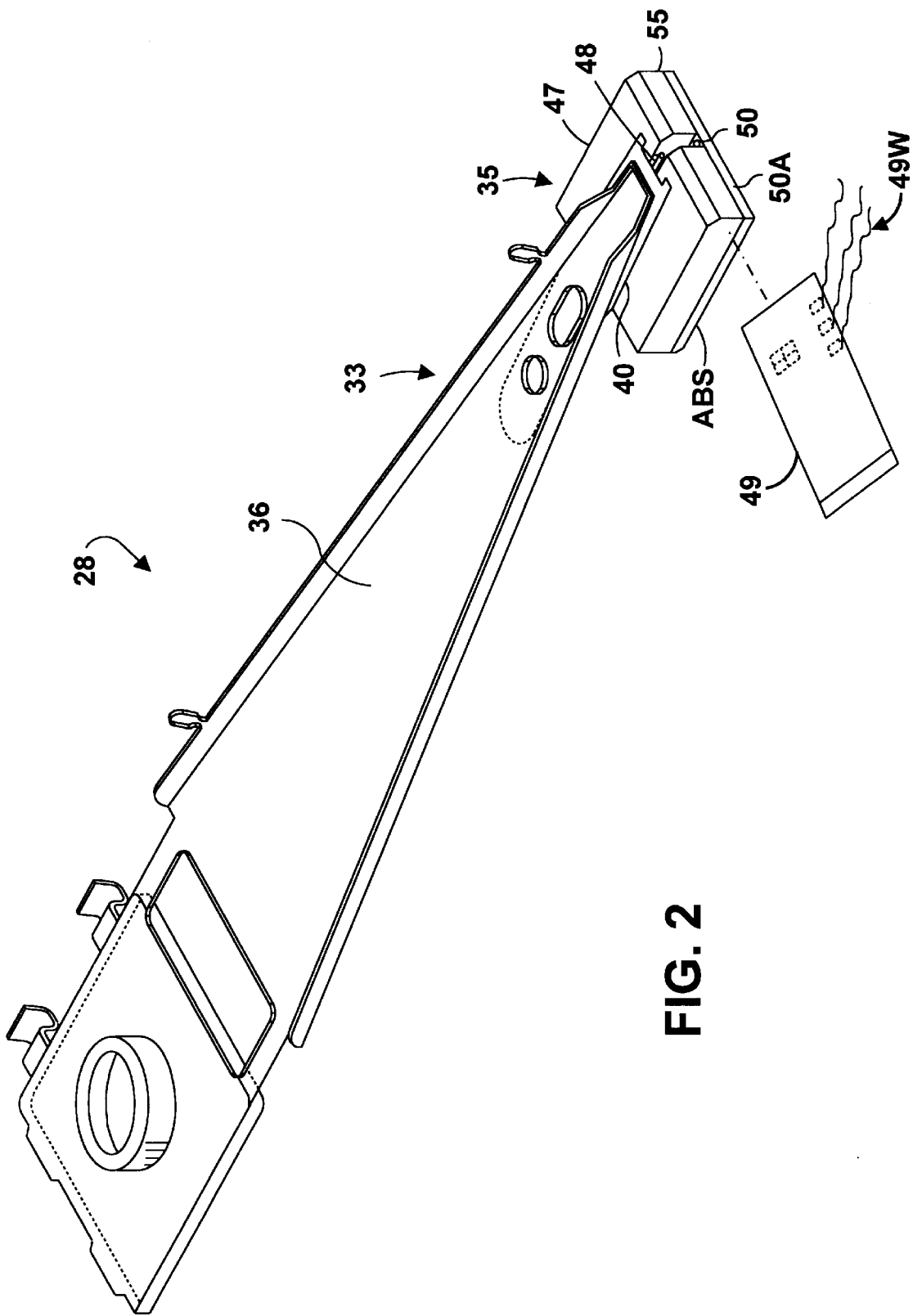
FIG. 2 is a perspective view of a head gimbal assembly comprised of a suspension, and a slider to which the read/write head of FIG. 1 is secured, for use in a head stack assembly.

A head gimbal assembly (HGA) 28 is secured to each of the actuator arms, for instance 18A. With reference to FIG. 2, the HGA 28 is comprised of a suspension 33 and a read/write head 35. The suspension 33 includes a resilient load beam 36 and a flexure 40 to which the head 35 is secured.

Figure 23:
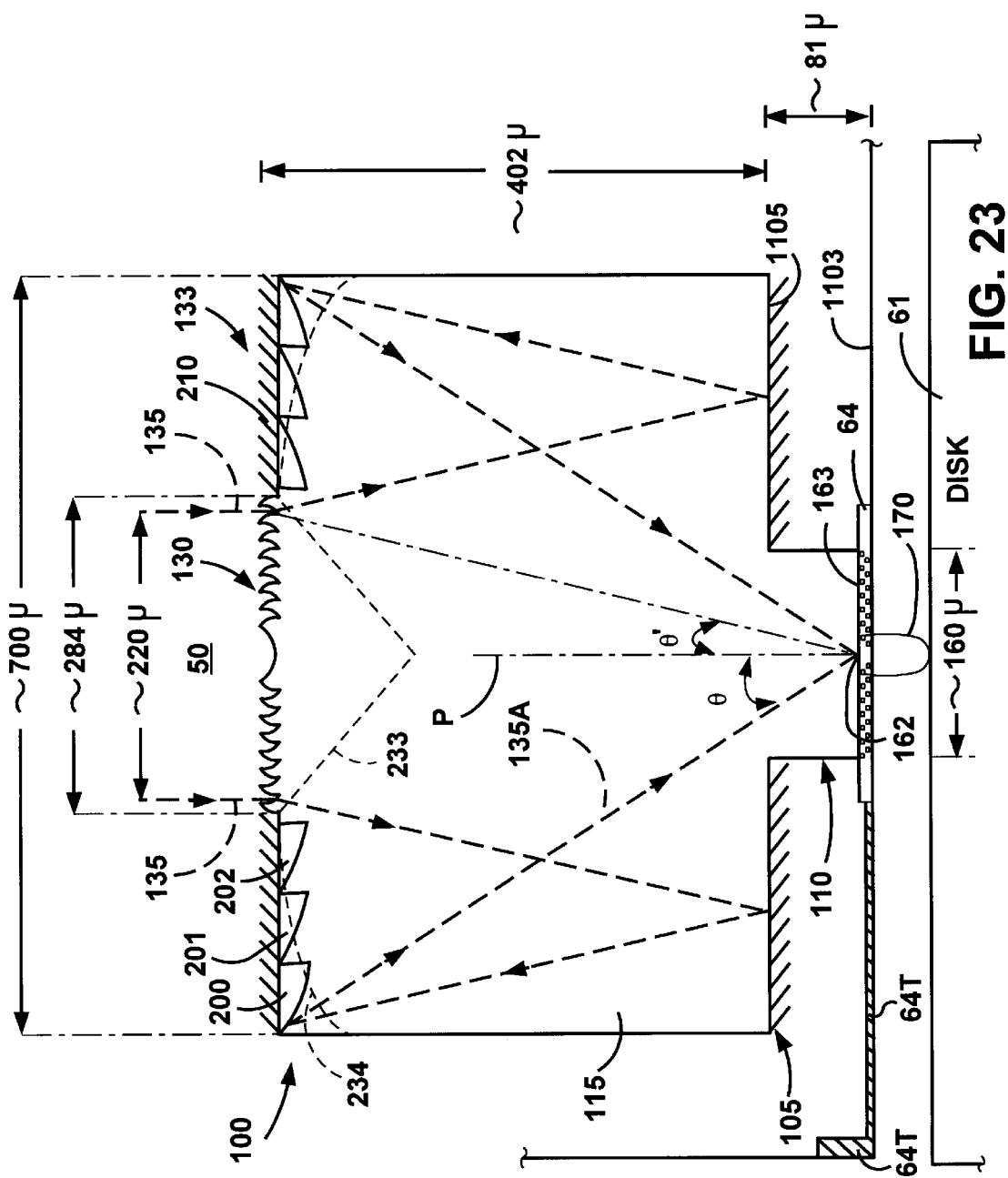
FIG. 23 is an enlarged, side elevational view of a catadioptric focusing device forming part of the write head of FIGS. 1 and 2, made according to the present invention.

In general, the head 35 is formed of a slider body (or slider) 47 secured to the free end of the load beam 36 by means of the flexure 40, and a lens / coil plate 1001 which is secured to the slider 47. The lens / coil plate 1001 comprises a substrate 1003 on (or within) which a catadioptric focusing device or lens 50 is formed on a first (or upper) side 1004 (FIG. 4). With further reference to FIG. 23, the lens / coil plate 1001 further comprises a coil or coil assembly 64 secured to the pedestal edge 163 for generating a desired write magnetic field. As is schematically illustrated by a block drawn in dashed lines (FIG. 3), the coil 64 is formed on (or within) a second (or bottom) side 1006 of the lens / coil plate 1001, opposite and in alignment with the focusing device 50.

With reference to FIGS. 3 through 7, the head 35 further includes an optical beam delivery means, such as a waveguide or a fiber 48. A stationary or a micro-machined dynamic reflective surface, such as a mirror 49 having mirror wires 49A, is secured to a trailing edge 55 of the slider 47 at a 45 degree angle relative to the optical beam emanating from the fiber 48, so as to reflect the optical beam onto the focusing device 50, in order to transduce data to and from a storage medium 61 (FIG. 23).

The slider body 47 can be a conventional slider or any other suitable slider. In the present illustration, the slider body 47 includes a fiber channel 1048 for receiving the optical fiber 48. Though the fiber channel 1048 is illustrated as being centrally located, i.e., along a generally central plane, relative to the slider body 47, it should be understood that the location of the fiber channel 1048 can be offset with respect to the central plane.

The slider body 47 further includes an optical opening 1050, which in this example, extends from, and is wider than the fiber channel 1048. The optical opening 1050 is formed in the slider trailing edge 55. The slider body 47 also includes two quarter-wave plate notches 1051 formed symmetrically in two opposite sides of the slider body 47, within the optical opening 1050. The quarter wave-plate notches 1050 cooperate to receive and retain a quarter wave-plate or any other suitable optical component 1052 (FIGS. 5–7) that assist in guiding and focusing an optical beam 135 (FIG. 23) emanating from the optical fiber 48.

A sloped surface 1049 can be formed on one or both sides of the trailing edge 55 relative to the optical opening 1050, in order to support the mirror 49 at the desired angle, for reflecting the optical beam 135 from the fiber 48, through the quarter-wave plate, the focusing device 50, and the coil assembly 64, unto the disk 61 (FIG. 23). As illustrated in FIG. 23, the optical opening 1050 is formed through the entire height of the slider body 47, which facilitates the wafer level, mass production of the slider body 47.

Figure 3:
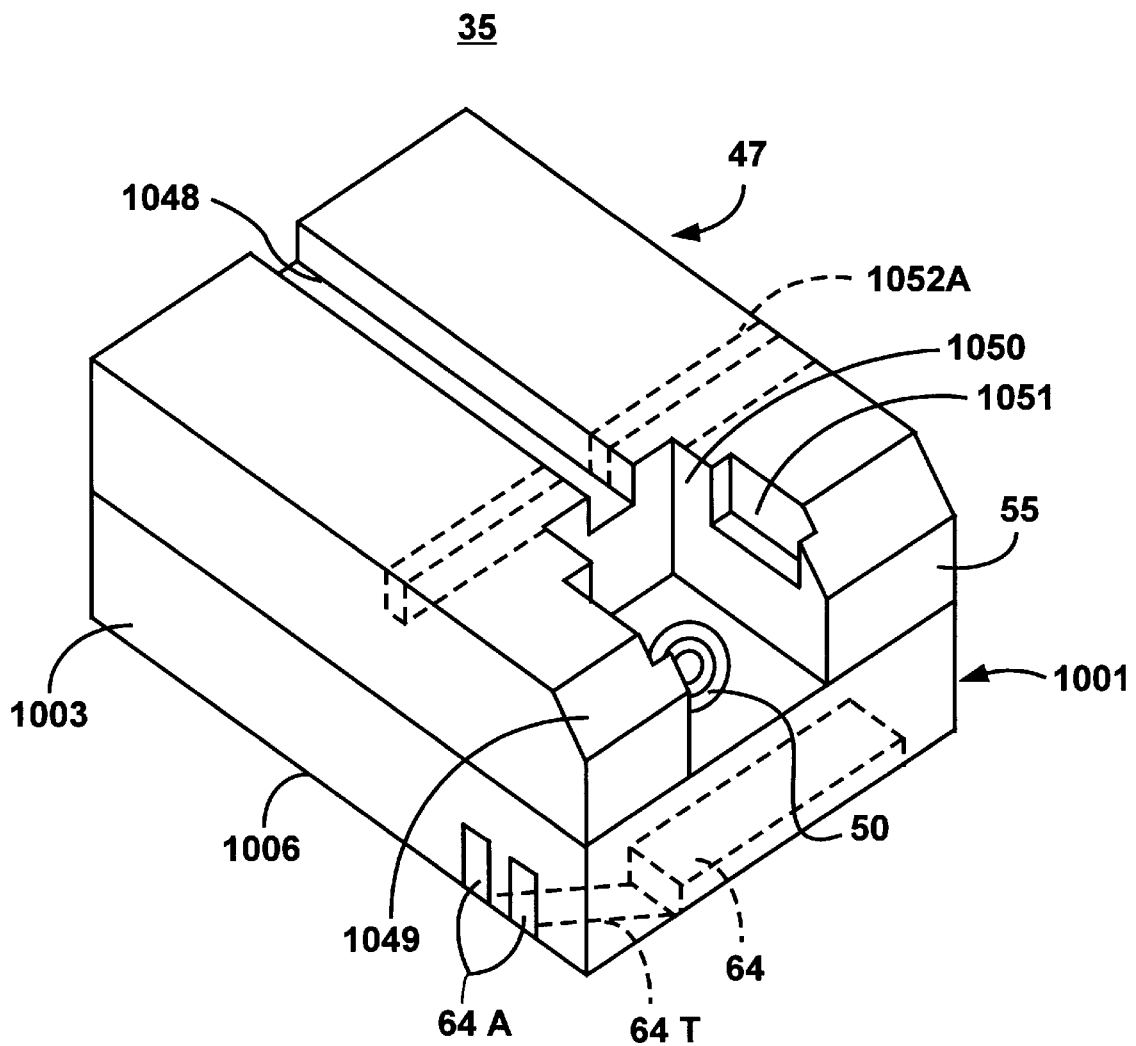
FIG. 3 is an enlarged perspective view of a head showing a focusing device according to the present invention.
Figure 4:
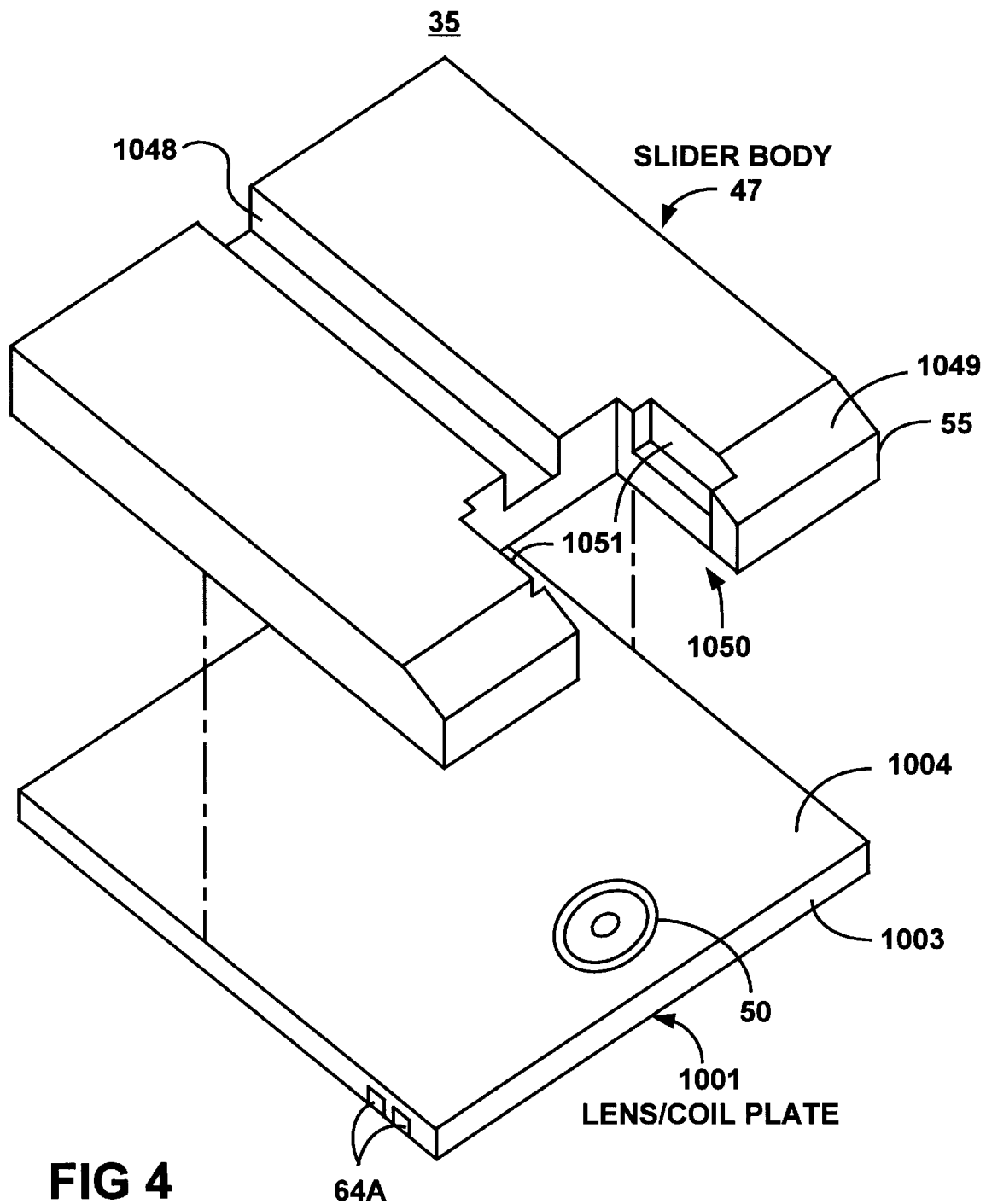
FIG. 4 is an exploded view of the head of FIG. 3, illustrating a slider body, and a lens coil plate.

Optionally, an adhesive relief channel 1052A, shown in dashed lines in FIG. 3, is formed in the upper surface of the slider body 47, transversely, i.e., at an angle, relative to the fiber channel 1048. The adhesive relief channel 1052A is preferably deeper than the fiber channel 1048, so that excess adhesive flows within the adhesive relief channel 1052A, and is thus prevented from overflowing into the optical opening 1050 and interfering with the optical path of the optical beam 135. The tip of the fiber optic 48 projects within the optical opening 1050. It should be clear that other channels and openings can be patterned within the slider body 47, for example to receive optical components, including but not limited to lenses, beam splitters, etc. to enhance the optical performance of the head 35.

The lens / coil plate 1001 is secured to the slider body 47 such that the focusing device 50 (or lens) is positioned substantially underneath the optical opening 1050, in optical alignment with the optical fiber 48, the mirror 49, the quarter-wave plate 1052, and the coil assembly 64.

Two contact pads 64A are formed in the side of the substrate 1003, as described below, for connection to coil wires 64W. Wire traces 64T connect the coil assembly 64 and the contact pads 64A. The coil wires 64W conduct an electrical current through the coil assembly 64 for energizing it.

Figure 11:
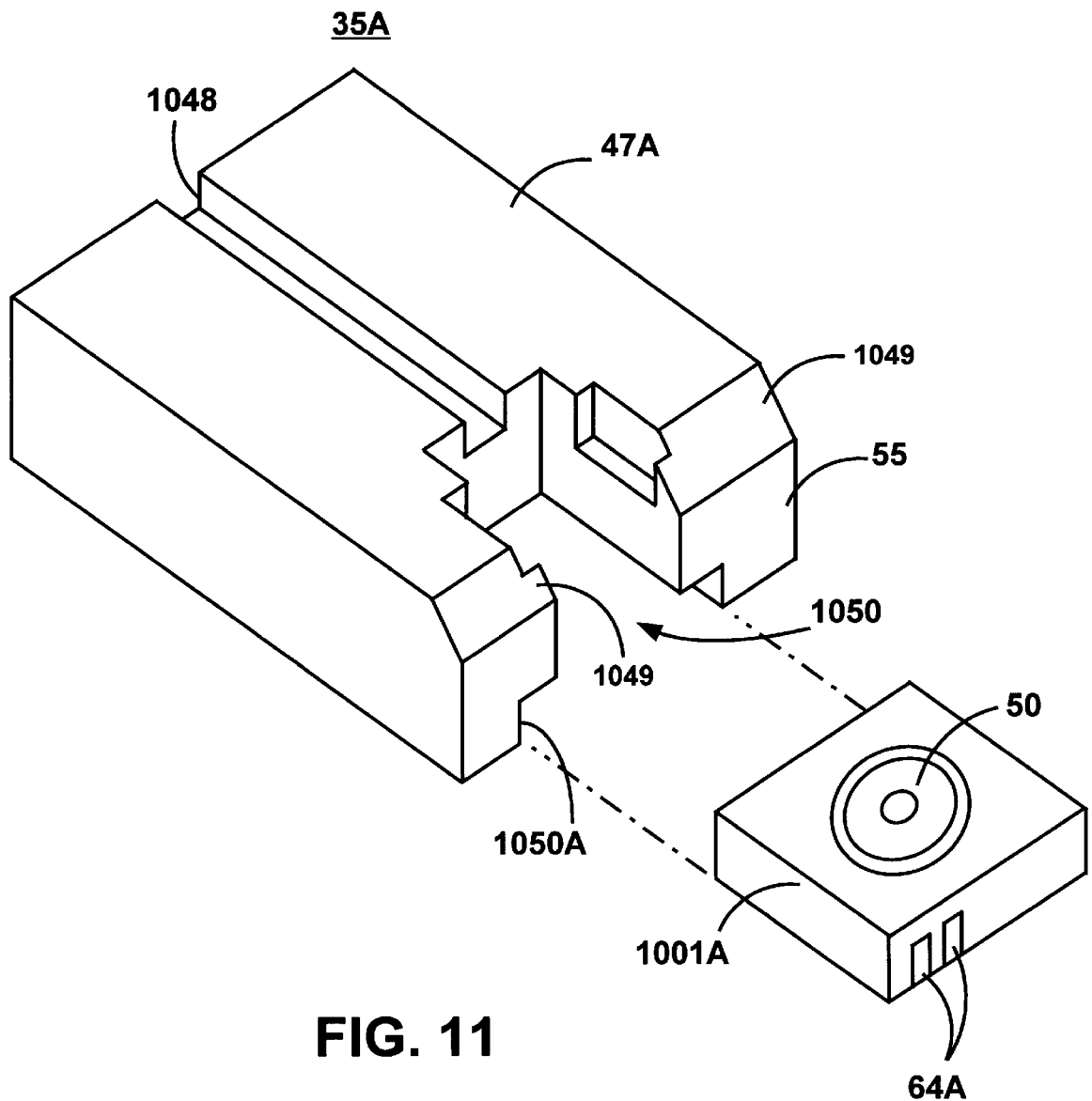
FIG. 11 is a perspective, exploded view of another head design, illustrating a slider body in the process being assembled to an individual focusing device made according to the present invention, and detached from the lens / coil wafer of FIG. 8.

FIG. 11 illustrates another head 35A which is basically similar in function to the head 35. The head 35A includes a slider body 47A that is similar to the slider body 47, with the exception that the slider body 47A includes an opening 1050A for receiving a lens / coil plate 1001A, within which the focusing device 50 and the coil assembly 64 are formed according to the present invention. According to this design, the lens / coil plate 1001A is individually fitted within the opening 1050A and secured to the slider body 47A, for example by means of epoxy.

Figure 8:
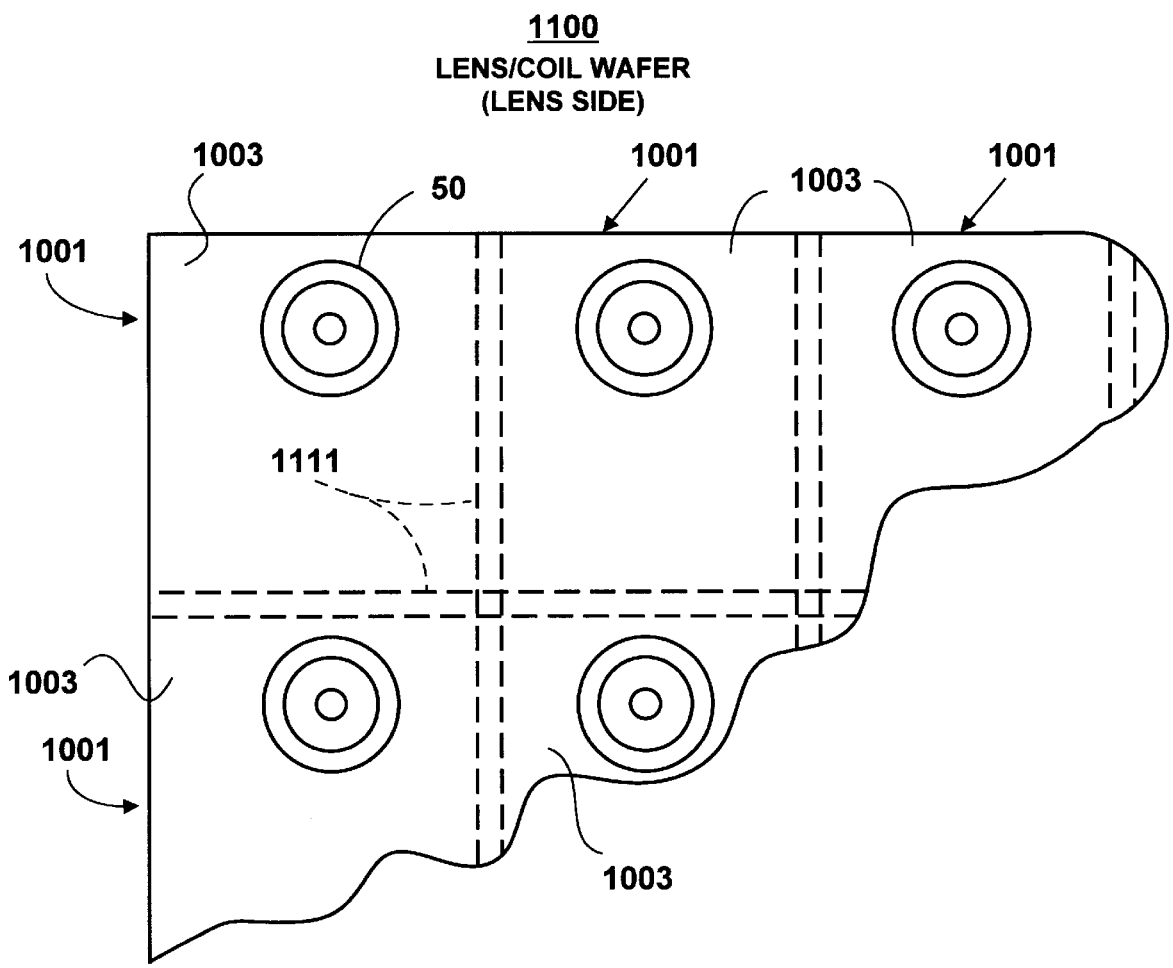
FIG. 8 is a fragmentary, top plan view of a lens / coil wafer, shown from the lens (or focusing device) side, on which a plurality of lens / coil plates of FIG. 4, are formed, and illustrating a plurality of focusing devices.
Figure 9:
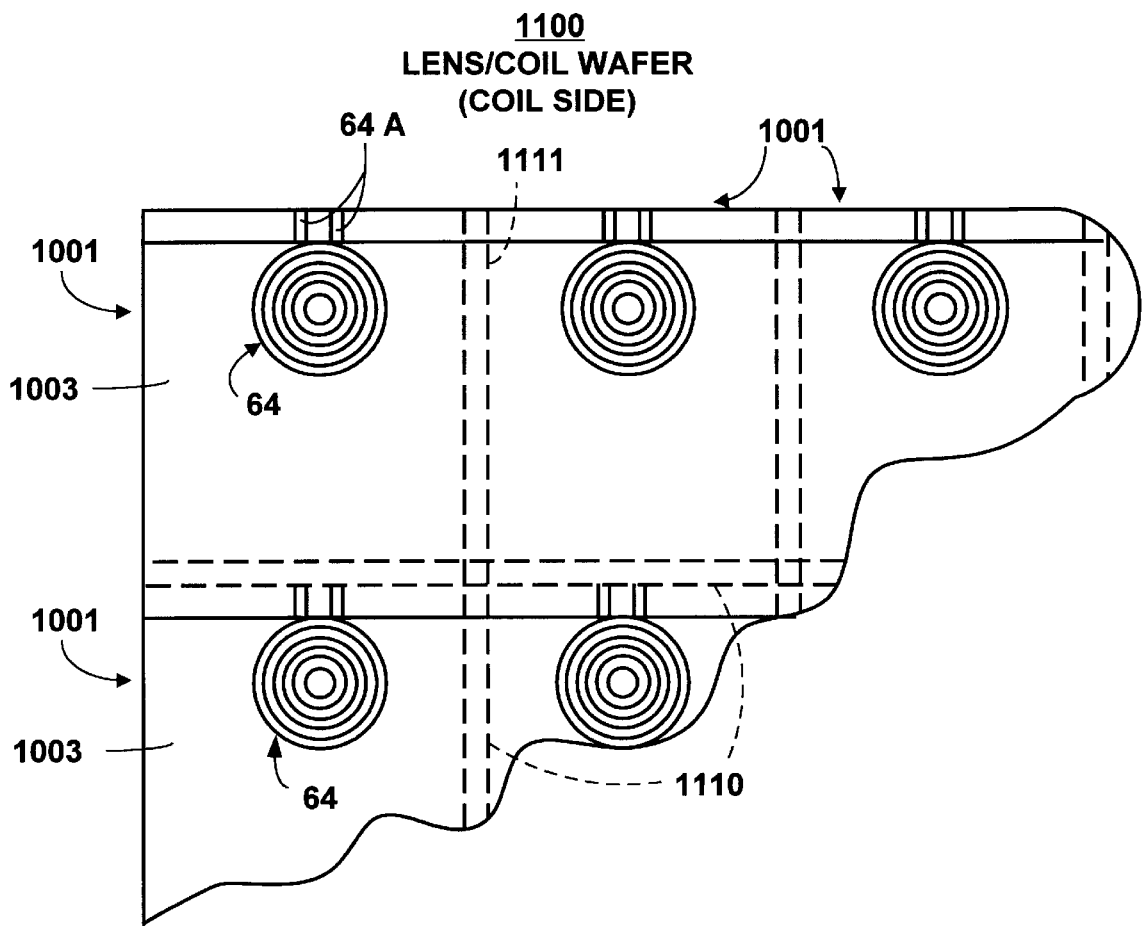
FIG. 9 is a fragmentary, bottom plan view of the lens coil wafer of FIG. 8, shown from the coil side, and illustrating a plurality of coils.

FIG. 8 illustrates a lens / coil wafer 1100, shown from the lens side, on which a plurality of lens / coil plates 1001 are formed. FIG. 9 is a bottom plan view of the lens coil wafer 1100 of FIG. 8, shown from the coil side, and illustrating a plurality of coils 64. By thin-film wafer processing of the lens / coil plate 1001, enables the mass producing and alignment of the lenses 50 and the coil assemblies 64.

Figure 10:
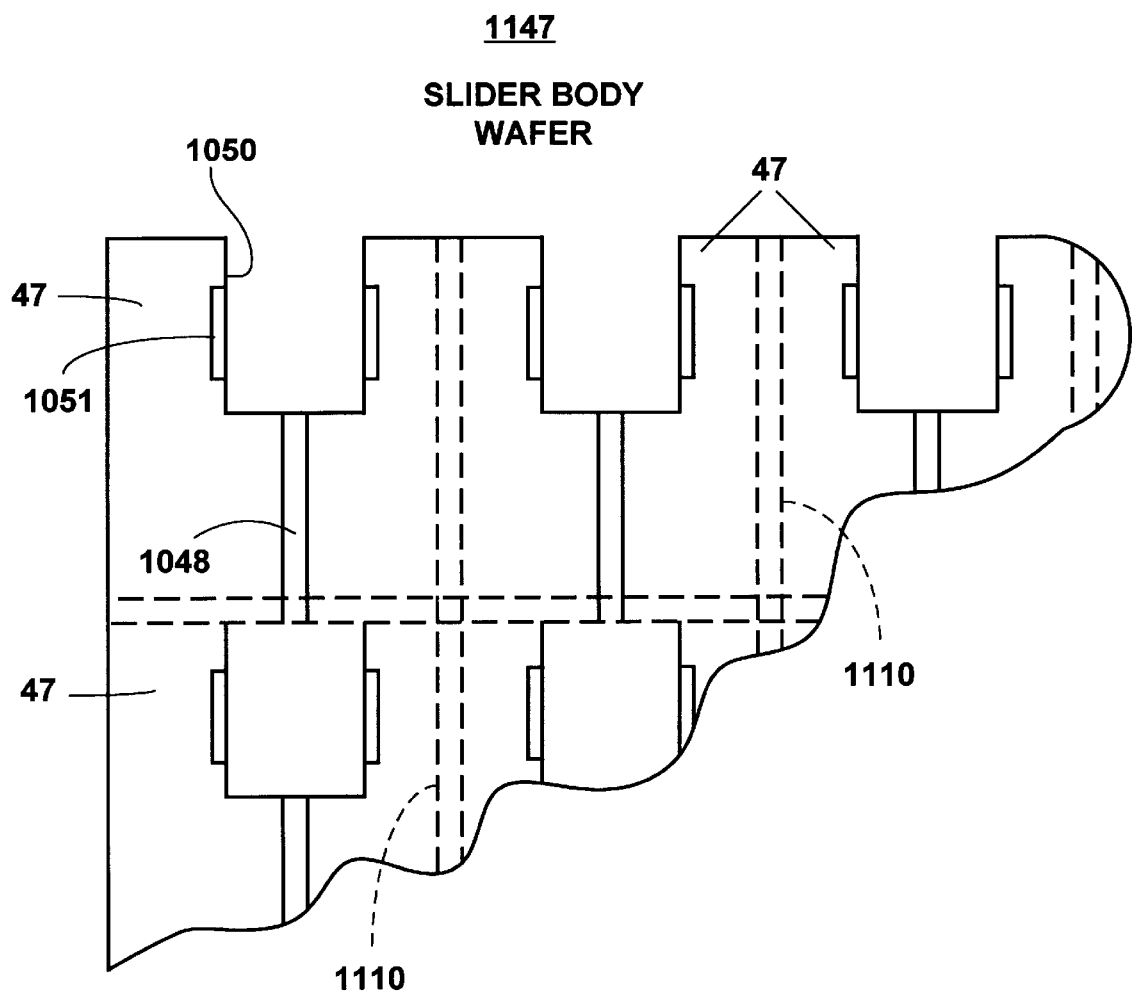
FIG. 10 is a fragmentary, top plan view of a slider body wafer containing a plurality of slider bodies shown in FIG. 4, for assembly to the lens coil wafer of FIGS. 8 and 9.

FIG. 10 illustrates a slider body wafer 1147 containing a plurality of slider bodies 47. The slider body wafer 1147 is assembled to the lens coil wafer of 1100 of FIGS. 8 and 9, by superimposing and aligning the slider body wafer 1147 on the upper surface of the lens coil wafer of 1100 (shown in FIG. 8). Once the two wafers 1147 and 1100 are secured, for example by means of epoxy or sonic or anodic bonding, the wafers 1147 and 1100 are sliced into individual, pre-aligned heads 35, along lines 1110 (shown in dashed lines). The coil wires 64W are then connected to the contact pads 64A, and each head is then fitted with an optical fiber 47, a mirror 49 and a quarter wave-plate 1052.

The method of making and self-aligning the head at a wafer level(without the optical fiber 47, mirror 49, or quarter wave-plate 1052) will now be explained in connection with FIGS. 12 through 22.

A flat glass (or optical) substrate or sheet is molded or pressed either individually or in batches as a wafer level, as shown for example in FIGS. 15 through 18, to form the lens shapes illustrated, for example in FIGS. 19 through 22. Other lens shapes, for example shown in FIG. 23 can also be formed. If the lenses 50 (or lens caps 1150) were not formed as part of the optical substrate used as part of the final product, the UV curable lens caps 1150 are attached to the optical substrate (See FIGS. 21 and 22) by means of epoxy and UV cured to the optical substrate 1110A.

Alternatively, and as illustrated in FIGS. 19, 20, and 23, the lens patterns 1150A, 130, 200, 201, 202 are heat pressed or molded. The lens patterns-can also be formed by photo polymer deposition, forming and etching including gray scale masking. In the embodiment shown in FIG. 23, the lens surface is substantially flat.

Coil cavities 64C are simultaneously formed with the lens patterns (FIGS. 19, 21), to accommodate the coil assembly 64. Conductive plugs or vias 1125 (FIG. 19) are formed in proximity to the cutting lines 1110, for wire bonding attachment to the coil 64. The plugs 1125 are filled with a conductive material such as copper. The plugs 1125 have an arc shaped cross section, for preventing the copper filling from being detached or removed from the plugs 1125 when the wafers are sliced into individual heads 35. In a preferred embodiment, the plugs 1125 do not extend through the entire depth of the optical wafer, thus further facilitating the mass production of the integrated heads 35.

Figure 12:
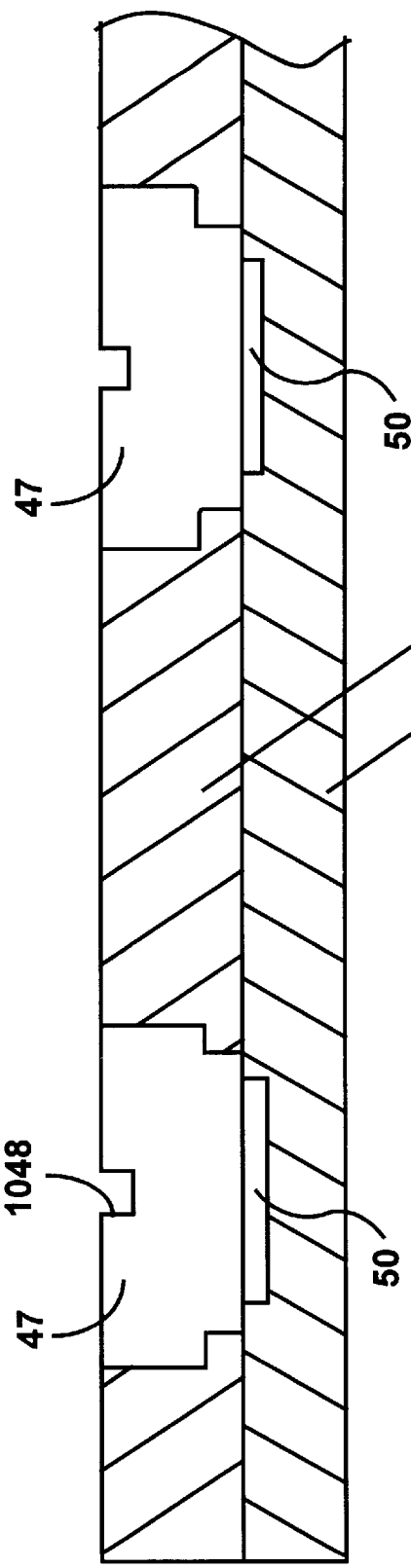
Figure 13:
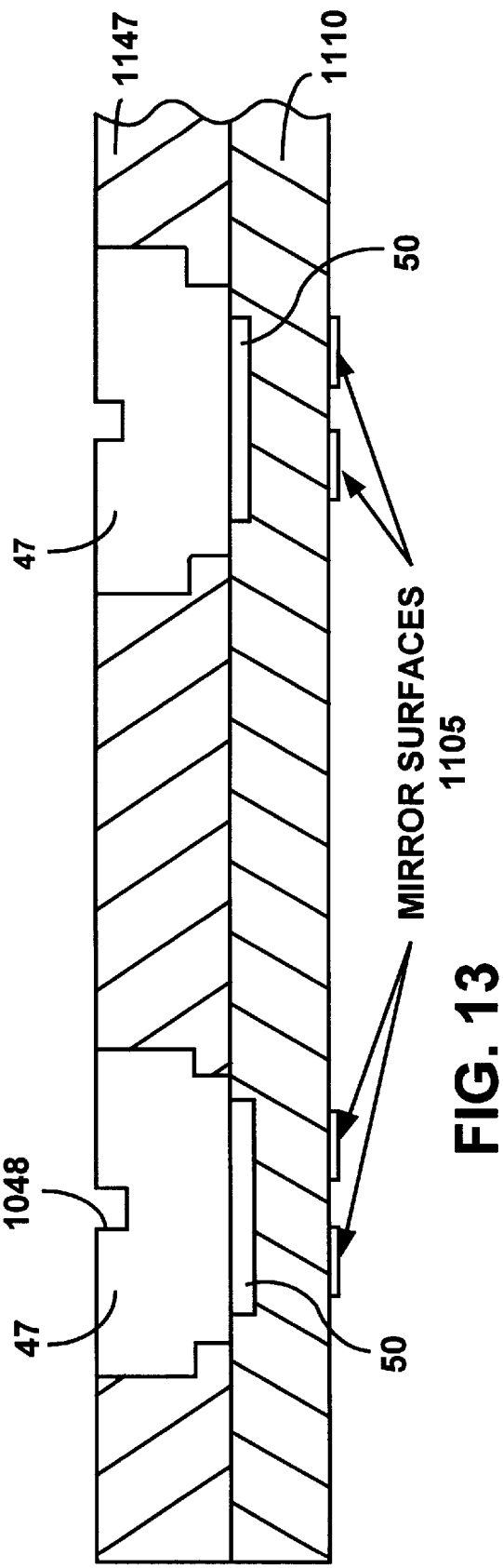

The slider body wafer 1147 is formed from silicon for example (see FIGS. 10, 12, 13). It should be noted that the etching, machining or forming of the fiber channel 1048 can be done subsequent to bonding the slider body wafer 1147 to the lens/coil wafer 1110. The slider body wafer 1147 and the lens/coil wafer 1110 are bonded, using known or available techniques such as: anodic bonding, diffusion, glass bonding using for example glass frift, or adhesive bonding for example epoxy.

Figure 14:
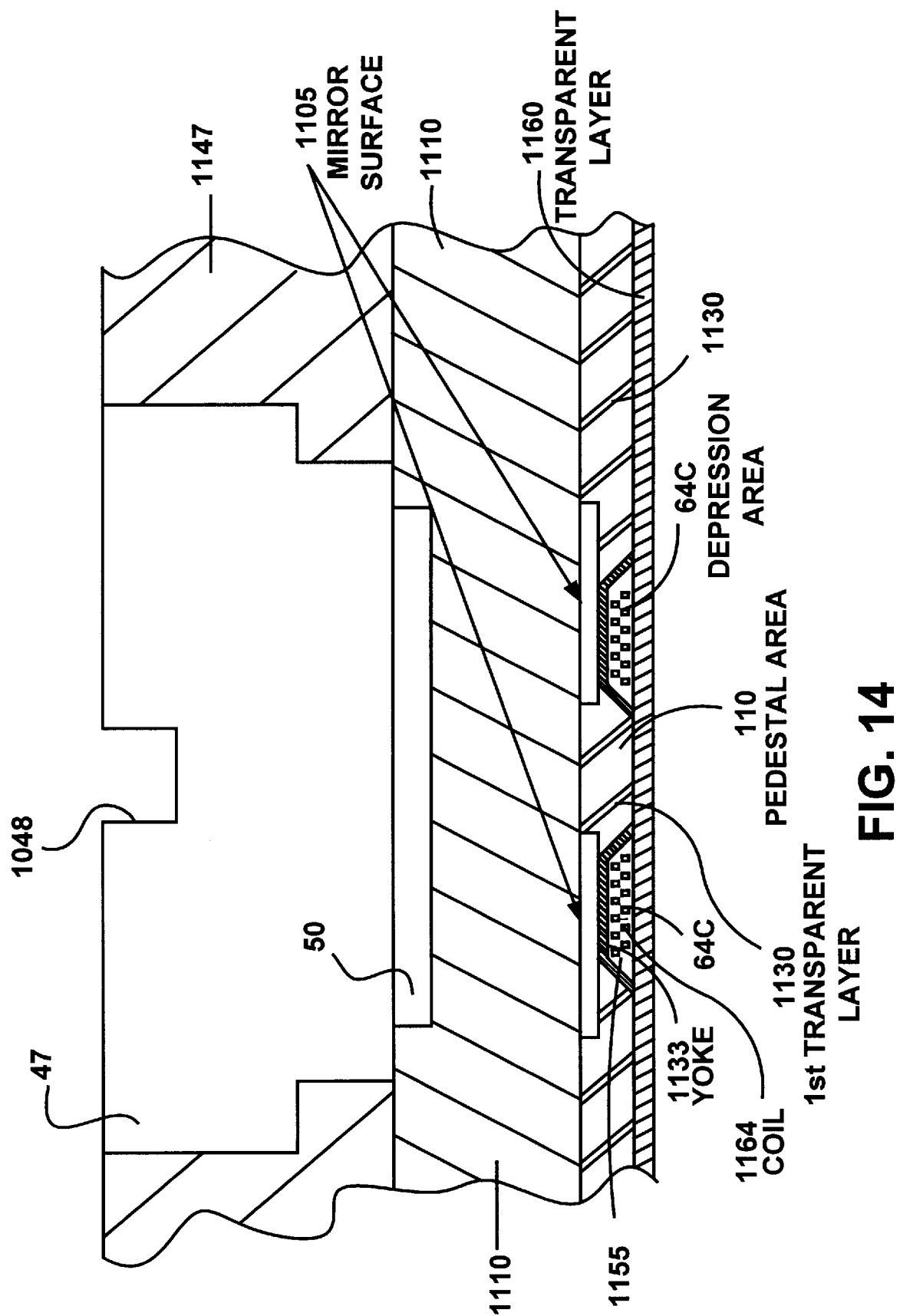
Figures 15, 16:
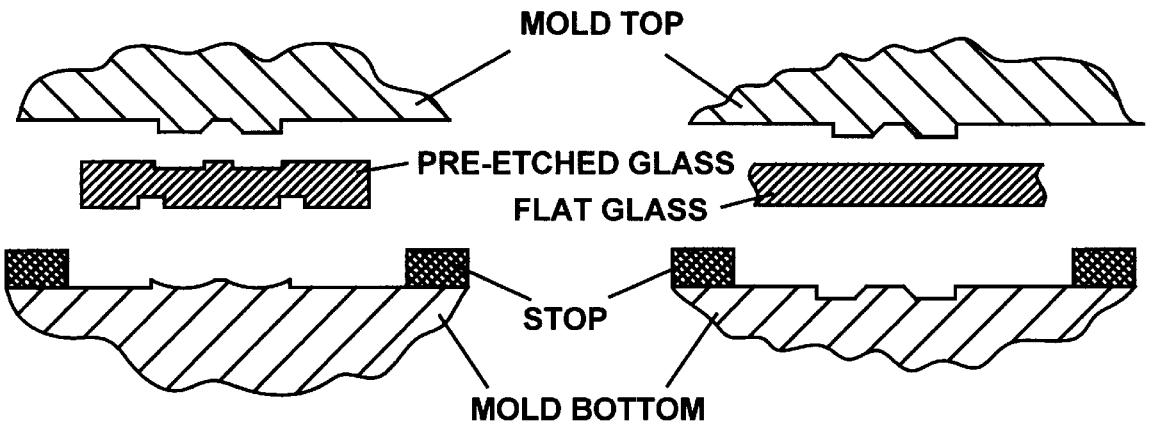
Figure 17:
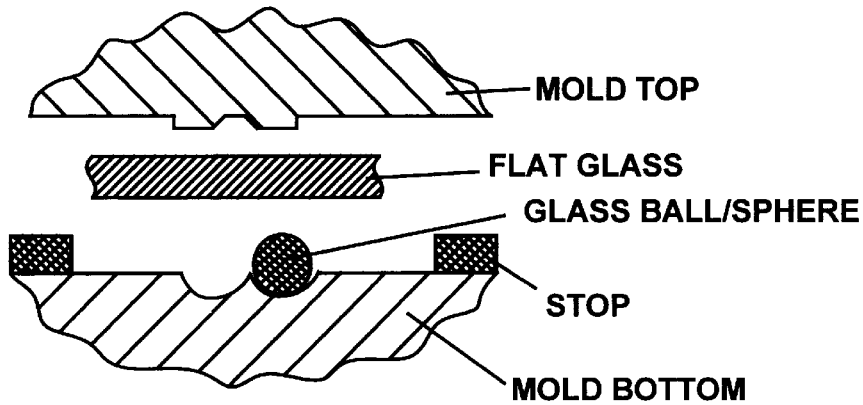
Figure 18:
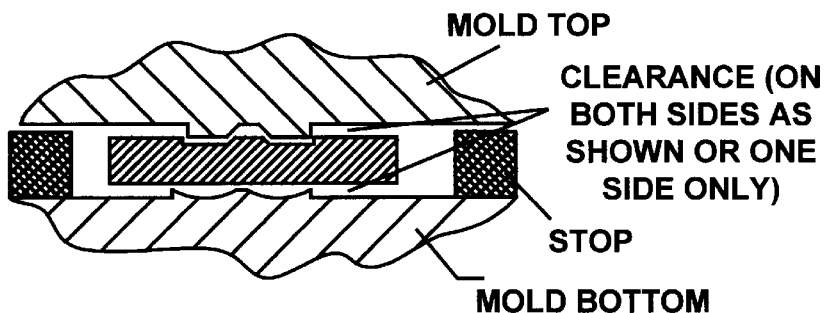

A coil 1164, and a pedestal 110 shown in FIGS. 14 and 23 are formed on the lens / coil plate 1001 using thin-film processing techniques. Reflective surfaces or mirrors 1105 are deposited on the bottom surface of the substrate 1110, opposite the lens 50. The mirror material around the pedestal 110 areas and plugs 1125 is masked and removed.

Alumina or a similar type first transparent material layer 1130 is then deposited to define the air bearing surface and the pedestal 110. Depressions or cavities 64C (See also FIG. 19) are then formed in the alumina layer around the pedestal 110, within which depressions the conductive coils 1164 will be formed.

Yoke or flux gather gathering layers 1133 are then formed by means of lithography and plating in the base and sides of the depressions to assume a desired shape. In a preferred embodiment, the yoke 1133 covers the conductive coils 1164 so as to optimize the collected magnetic field.

An insulating layer 1155 is formed on the yoke 1133, and a first layer of conductive coils 1164 are deposited on the insulating layer 1155 by means of, for example, lithography and plating. An insulating layer is then formed on the first layer of conductive coils 1164, and a second layer of conductive coils 1164 is deposited thereon. These steps are repeated until the desired number of coil layers is reached.

A protective layer 1160 of insulating and transparent material is deposited on the final coil layer to provide a protective seal to the coil assembly 64. The protective layer 1160 is then lapped to correct the lens thickness and to provide the proper focal plane 163 (FIG. 23).

An alternative approach to forming the coil cavity 64C is to heat press it into the glass wafer as shown in FIGS. 15, 16, 18, 19, 21. Such heat pressing step will precede the step of depositing the reflective surfaces 1105.

The air bearing surface (ABS) of the slider 47 is then formed, by for example etching, into the protective layer 1160. The heads 35 are then sliced or etched away from the wafer, into individual heads. The quarter wave plate, mirror, wires, and optical fiber are then assembled to the head 35 and aligned, to complete the manufacture of the head 35. The head 35 is then assembled to the suspension as is known in the field to form the HGA 28 (FIG. 2).

The details of the focusing device 50 will now be described with reference to FIG. 23. The focusing device 50 includes an incident surface 100, a reflective surface 105, a focal pedestal 110, and a body 115. The incident surface 100 is generally flat and is comprised of a central diffractive, optically transmissive surface 130 and a peripheral diffractive or kinoform phase profile 133. In a preferred embodiment, the body is an optically transparent lens body, and the incident surface 100 is formed on a first side of the body 115. The reflective surface 115 is formed on a second side of the body 115, such that the first and second sides are preferably, but not necessarily, oppositely disposed. The focal pedestal 110 is formed on the same side as the reflective 105.

In use, an incident optical beam, such as a laser beam 135 impinges upon the central surface 130, and is diffracted thereby. The incident laser beam 135 can be collimated, convergent or divergent. The laser beam 135 passes through the transparent body 115, and impinges upon the reflective surface 105. The laser beam is then reflected by the reflective surface 105, through the body 115, unto the peripheral surface 133. The laser beam 135 is reflected and also diffracted or refracted by the peripheral surface 133 as a focused beam 135A, through the body 115, and is focused in a focal point 162 located at, or in close proximity to an edge 163 of the focal pedestal 110.

The focal point 162 is located in very close proximity to the disk 61 such that a localized evanescent field or light 170 interacts with disk 61, enabling data to be transduced to and from the disk 61.

The focused beam 135A defines an angle of incidence θ with a central plane P. It should be clear that the angle of incidence θ is greater than the angle of incidence θ had the optical beam 135 not undergone the sequence of reflections and diffractions as explained herein. As a result, the NA of the focusing device 50 exceeds that of a conventional objective lens, as supported by the following equation:

$$NA = n \cdot \sin\theta,$$

where n is the index of refraction of the lens body 115. According to the present invention, it is now possible to select the lens body 115 of a material with a high index of refraction n, in order to increase NA.

Though exemplary dimensions of the focusing device 50 are illustrated in FIG. 23, within an acceptable range, it should be clear that these dimensions can be scaled as desired for the intended applications.

In one embodiment, the peripheral surface is formed of kinoform phase profile 133, which includes a pattern of refractive profiles i.e., 200, 201, 202. While only three refractive profiles are illustrated, it should be understood that a greater number of refractive profiles can be selected. The pattern of refractive profiles 200, 201, 202 is coated with a reflective surface 210. In another embodiment, the peripheral kinoform phase profile 133 can be replaced with an appropriate diffractive grating or profiles, or with an appropriate lens structure such as a Fresnel lens.

The focal pedestal 110 is formed integrally with lens body 115, and extends below the reflective surface 105.

Figure 25:
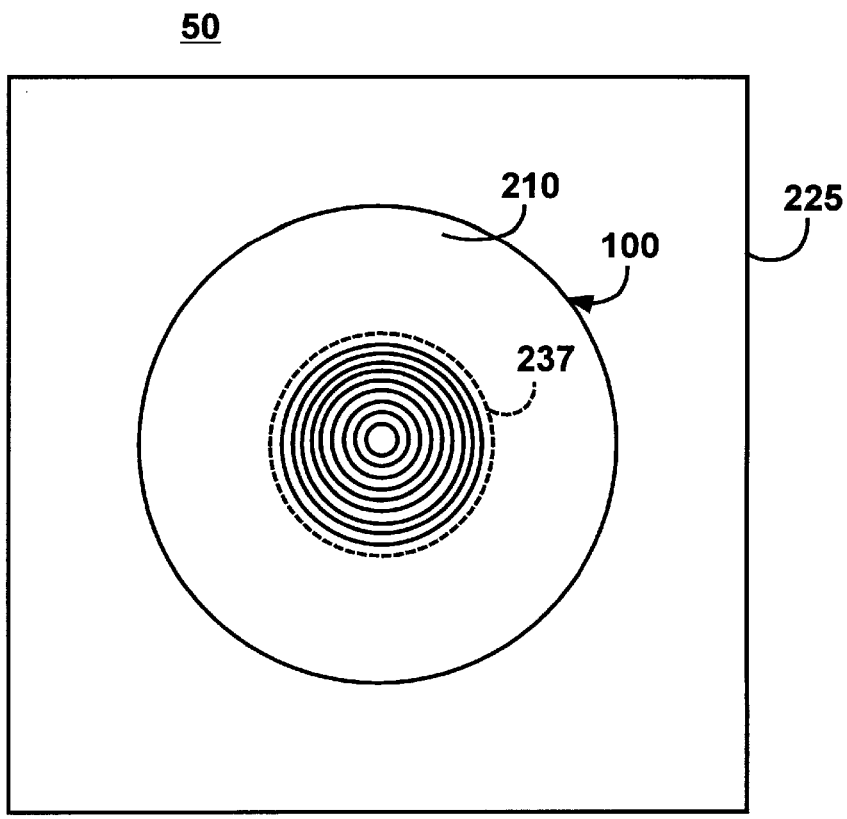
FIG. 25 is a top plan view of the catadioptric focusing devices of FIGS. 23 and 24.
Figure 26:
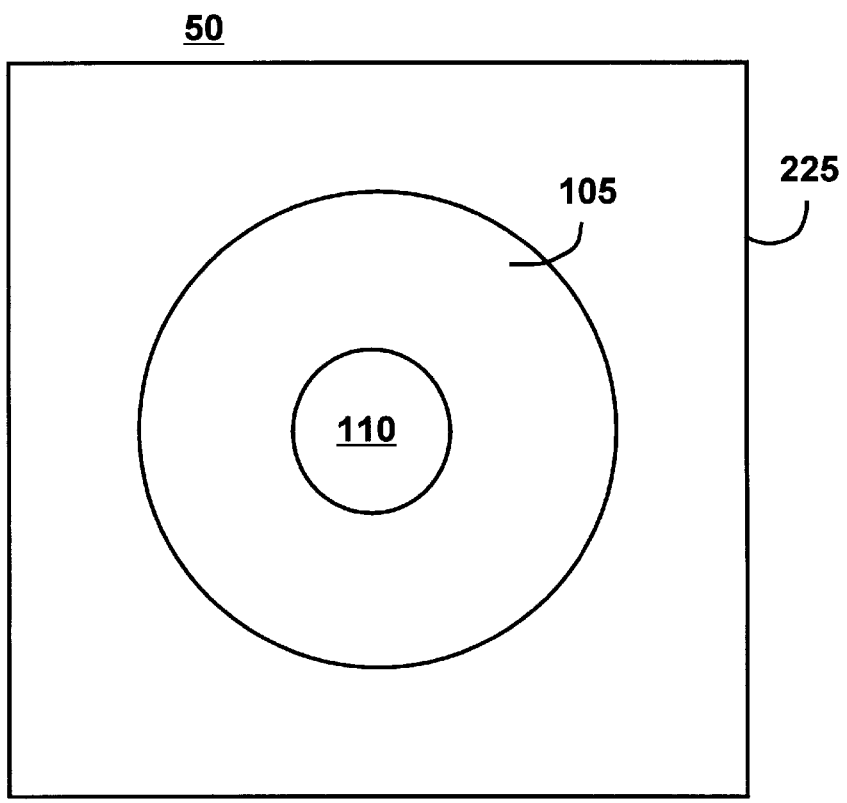
FIG. 26 is a bottom plan elevational view of the catadioptric focusing devices of FIGS. 23 and 24.

With more particular reference to FIGS. 25 and 26, the focusing device 50 is generally cylindrically shaped, and is formed within a substrate 225. The transmissive surface 130 (FIG. 25) concentric relative to, and is disposed within the reflective surface 210. The transmissive surface 130 can simulate holographic or virtual flat, spherical, conical or other suitable diffractive surfaces 233 (shown in dashed lines in FIG. 23), while retaining its generally flat configuration. The reflective surface 210 is ring shaped. In an alternative design, the kinoform phase profile can simulate an aspherical refractive or diffractive surface 234 (shown in dashed lines in FIG. 23), while 26 retaining its generally flat configuration.

The focal pedestal is generally cylindrically shaped, and is co-axially, and concentrically disposed relative to the reflective surface 105. In an alternative embodiment, the incident surface includes an alignment ring 237 (shown in dashed lines), to assist in the alignment of the focusing device 50 during assembly to the slider 47.

The focusing device 50 can be made using molding, etching, or other suitable manufacturing techniques. The flatness of the incident surface 100 allows wafer processing techniques to be used to mass assemble a lens wafer in which a plurality of focusing devices 50 are formed, to a slider wafer in which a plurality of sliders 47 are formed.

Using the present focusing device 50, it is possible to reduce the spot size on the disk 61 to less than 0.3 microns. The focusing device 50 can be made of any suitable transparent material, including but not limited to glass, plastic, etc.

Figure 24:
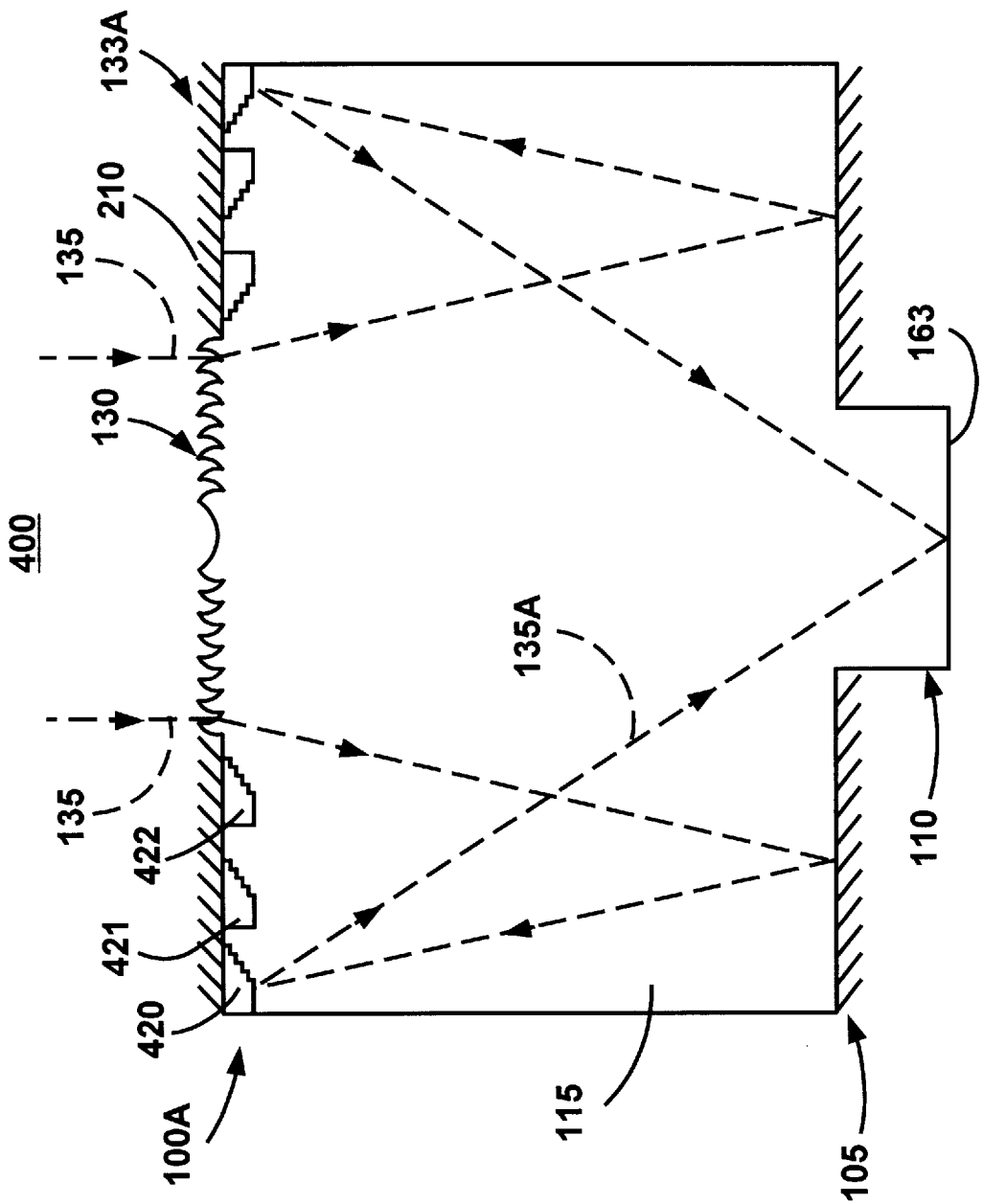
FIG. 24 is an enlarged, side elevational view of another catadioptric focusing device forming part of the read/write head of FIGS. 1 and 2, and made according to the present invention.

FIG. 24 illustrates another catadioptric focusing device 400 according to the present invention. The focusing device 400 is generally similar in function and design to the focusing device 50, and has its incident surface 100A comprised of a peripheral kinoform phase profile 133A. The peripheral kinoform phase profile 133A is formed of a reflective surface 210 and a pattern of concentric binary refractive profiles i.e., 420, 421, 422. The resolution of the refractive profiles 420, 421, 422 can vary, for example increase, in order to obtain a more precise control over the diffraction of the laser beam 135A.

Figure 27:
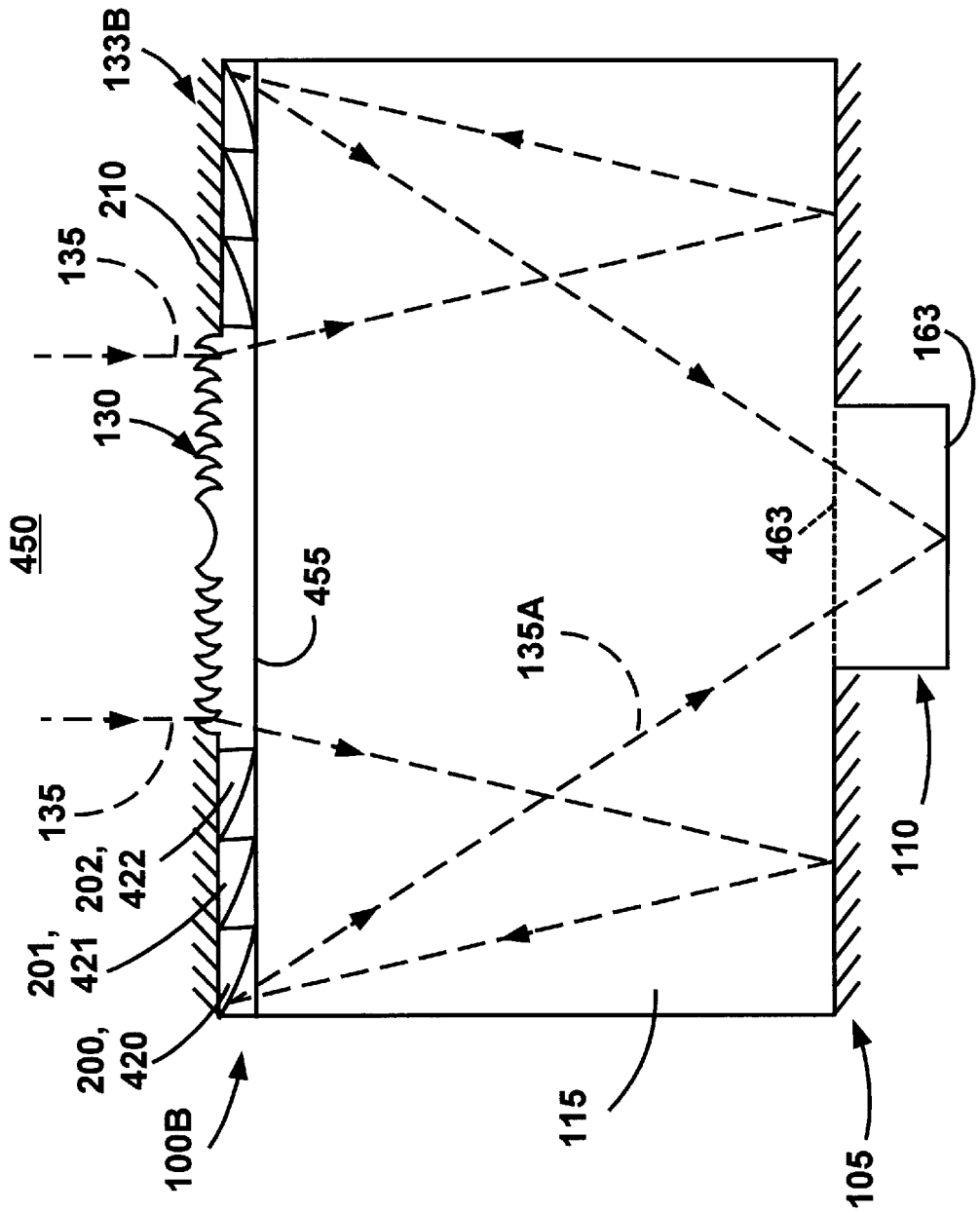
FIG. 27 is an enlarged, side elevational view of yet another catadioptric focusing device forming part of the read/write head of FIGS. 1 and 2, and made according to the present invention.

FIG. 27 illustrates another catadioptric focusing device 450 according to the present invention. The focusing device 450 is generally similar in function and design to the focusing devices 50 and 400, and has its incident surface 100B comprised of a peripheral kinoform phase profile 133B. The peripheral kinoform phase profile 133B is formed of a reflective surface 210 and a pattern of concentric binary refractive profiles i.e., 200, 201, 202 or 420, 421, 422. Whereas in the focusing devices 50 and 400, the incident surfaces 100, 100A, respectively are formed integrally with the lens body 115, the incident surface 100B is formed of a separate plate that is secured to the lens body 115 along a generally flat surface 455.

Another optional distinction between the focusing device 450 of FIG. 27 and the focusing devices 50 and 400 of FIGS. 23 and 24, respectively, is that the focal pedestal 110 can be made of a separate plate that is secured to the lens body 115 along a central, non-reflective surface 463 of the bottom of the lens body 115.

Figure 28:
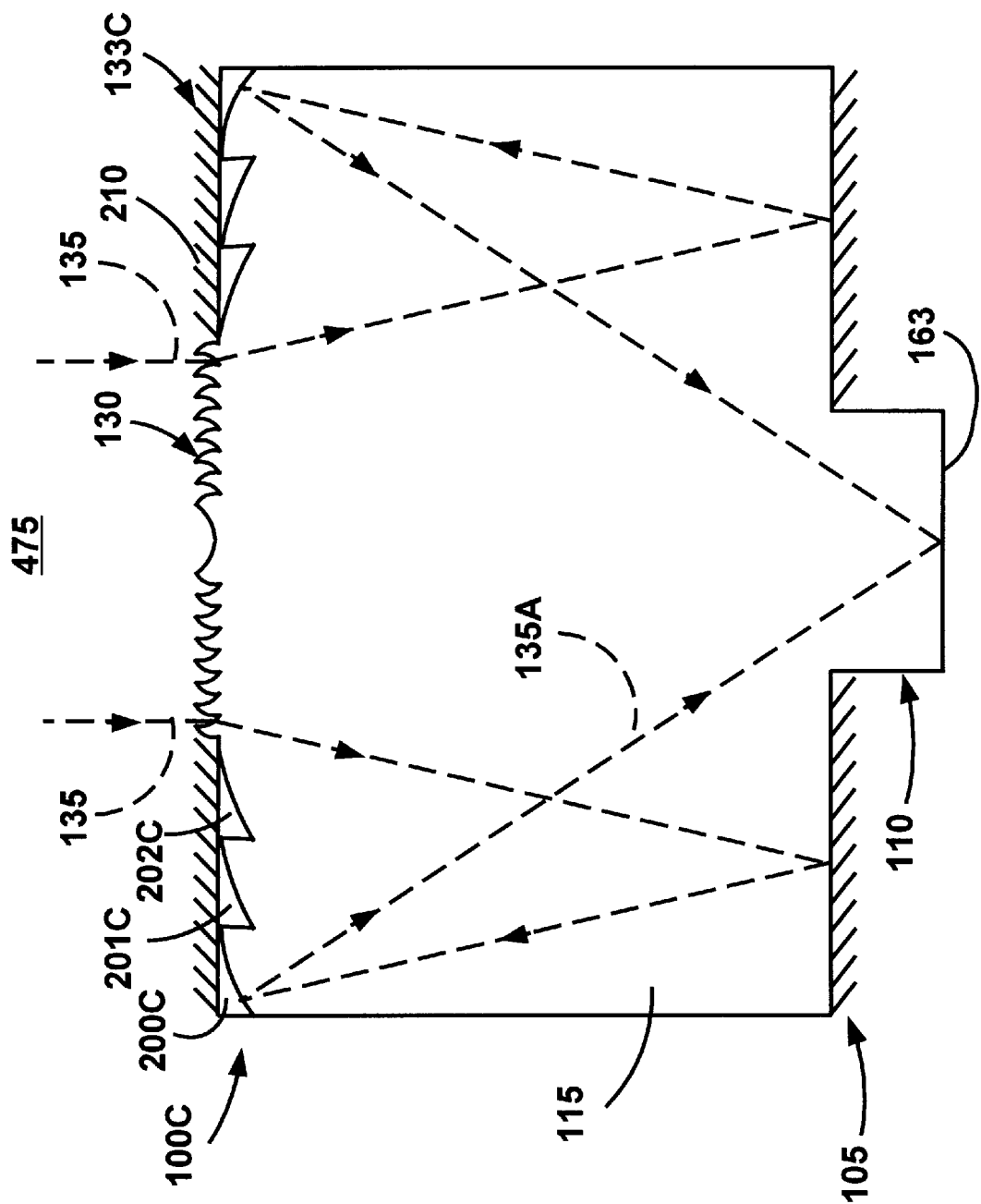
FIG. 28 is an enlarged, side elevational view of still another catadioptric focusing device forming part of the read/write head of FIGS. 1 and 2, and made according to the present invention.

FIG. 28 illustrates another catadioptric focusing device 475 according to the present invention. The focusing device 475 is generally similar in function and design to the focusing devices 50, and has its incident surface 100C comprised of a peripheral kinoform phase profile 133C. The peripheral kinoform phase profile 133C includes a pattern of refractive profiles i.e., 200C, 201C, 202C that are similar in function to the refractive profiles i.e., 200, 201, 202.

Figure 29:
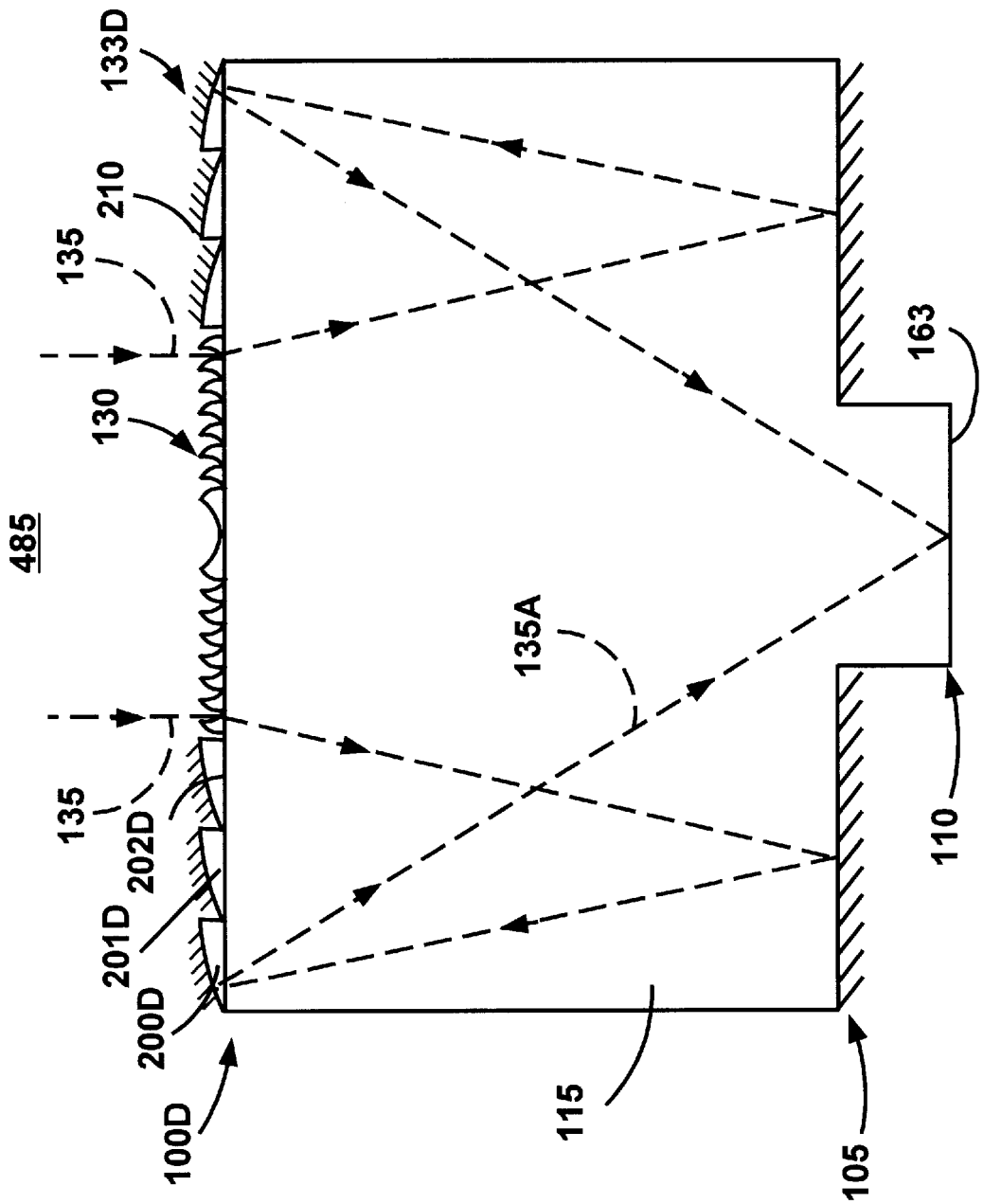
FIG. 29 is an enlarged, side elevational view of another catadioptric focusing device forming part of the read/write head of FIGS. 1 and 2, and made according to the present invention.

FIG. 29 illustrates another catadioptric focusing device 485 according to the present invention. The focusing device 485 is generally similar in function and design to the focusing devices 50, and has its incident surface 100D comprised of a peripheral kinoform phase profile 133D. The peripheral kinoform phase profile 133D includes a pattern of refractive profiles i.e., 200D, 201D, 202D that are similar in function to the refractive profiles i.e., 200,201, 202.

It should be understood that the geometry, compositions, and dimensions of the elements described herein may be modified within the scope of the invention and are not intended to be the exclusive; rather, they can be modified within the scope of the invention. Other modifications may be made when implementing the invention for a particular environment. The use of the focusing device is not limited to data storage devices, as it can be used in various other optical applications, including but not limited to high resolution microscopy, surface inspection, and medical imaging.

What is claimed is:

1. A method of making a head comprising:

forming a plurality of lens patterns in a first side of an optical substrate;

forming a plurality of coil depressions in a second side of said optical substrate;

forming a plurality of slider bodies in a slider body substrate;

securing said slider body substrate to said first side of said optical substrate; and forming a plurality of coil assemblies in said plurality of coil depressions.

2. A method according to claim 1, wherein forming said plurality of coil assemblies in said plurality of coil depressions includes forming coil assemblies opposite to, and in optical registration with said lens patterns.

3. A method according to claim 2, wherein forming said coil assemblies includes forming a flux gathering layer in said coil depressions.

4. A method according to claim 3, wherein forming said coil assemblies includes forming an insulating layer on said flux gathering layer; and forming a layer of conductive coils on said insulating layer.

5. A method according to claim 1, wherein forming said coil depressions includes forming said coil depressions simultaneously with said lens patterns.

6. A method according to claim 1, wherein forming said lens patterns includes using any one or more methods: heat pressing, molding, photo polymer deposition, or gray scale masking.

7. A method according to claim 1, wherein forming said lens patterns includes forming substantially flat lens patterns.

8. A method according to claim 1, further including forming cutting lines along which said lens patterns can be individually separated.

9. A method according to claim 8, further including forming a plurality of plugs in proximity to said cutting lines for electrical attachment to said coil assemblies.

10. A method according to claim 9, further including filling said plugs with a conductive material.

11. A method according to claim 10, wherein forming said plugs includes shaping said plugs to prevent detachment upon separation of said lens patterns along said cutting lines.

12. A method according to claim 1, further including forming a plurality of pedestals on said second side of said optical substrate.

13. A method according to claim 12 wherein securing said slider body substrate and said optical substrate includes bonding using any one or more methods: anodic bonding, diffusion, glass frift, or adhesive bonding.

14. A method according to claim 12, further including selectively depositing reflective surfaces on said second side of said optical substrate, around said pedestals.

15. A method according to claim 12, further including lapping said second side to a desired thickness to provide a desired focal plane.

16. A method according to claim 12, wherein said optical substrate is made of glass, and wherein forming said lens patterns and said coil depressions includes heat pressing said glass substrate.

17. A method of making a head comprising:

forming a plurality of lens patterns in a first side of an optical substrate;

forming a plurality of coil depressions on a second side of said optical substrate, forming a plurality of slider bodies in a slider body substrate;

forming a plurality of pedestals on said second side of said optical substrate;

selectively forming a plurality of reflective surfaces on said second side around said plurality of pedestals;

securing said slider body substrate to said first side of said optical substrate; and forming a plurality of coil assemblies in said plurality of coil depressions on said second side.

18. A method according to claim 17, wherein forming said lens pattern s include s using any one or more methods: heat pressing, molding, photo polymer deposition, or gray scale masking.

19. A method according to claim 17, wherein forming said lens patterns includes forming substantially flat lens patterns.

20. A method according to claim 17, further including forming cutting lines along which said lens patterns can be individually separated;

forming a plurality of plugs in proximity to said cutting lines for electrical attachment to said coil assemblies, and filling said plugs with a conductive material; and shaping said plugs to prevent their detachment upon separation of said lens patterns along said cutting lines.

21. A method according to claim 17, further including selectively depositing reflective surfaces on said second side of said optical substrate.

22. A method according to claim 17 wherein forming said plurality of coil assemblies includes:

forming a flux gathering layer in said coil depressions;

forming an insulating layer on said flux gathering layer; and forming a layer of conductive coils on said insulating layer.

23. A method according to claim 17, wherein said optical substrate is made of glass, and wherein forming said lens patterns and said coil depressions includes heat pressing said glass substrate.

24. A method according to claim 17, wherein forming a lens pattern includes: forming a substantially flat incident surface comprised of a diffractive, optically transmissive surface and a peripheral diffractive and reflective surface; and forming a substantially flat incident surface comprised of a flat diffractive, optically transmissive surface and a peripheral surface that includes a kinoform phase profile.

25. A method according to claim 17, wherein securing said slider body substrate and said optical substrate includes bonding using any one or more methods: anodic bonding, diffusion, glass frift, or adhesive bonding.

26. A method of making an optical device comprising:

forming a plurality of lens patterns in a first side of an optical substrate;

forming a plurality of pedestals on a second side of said optical substrate;

selectively forming a plurality of reflective surfaces on said second side around said plurality of pedestals;

forming a plurality of coil depressions in said second side; and forming a plurality of coil assemblies in said plurality of coil depressions.

27. A method according to claim 26, wherein forming a lens pattern includes forming a substantially flat incident surface comprised of a diffractive, optically transmissive surface and a peripheral diffractive and reflective surface.

28. A method according to claim 26, wherein forming a lens pattern includes forming a substantially flat incident surface comprised of a flat diffractive, optically transmissive surface and a peripheral surface that includes a kinoform phase profile.

29. A method according to claim 26, wherein forming said lens patterns includes using any one or more methods: heat pressing, molding, photo polymer deposition, or gray scale masking.

30. A method according to claim 26, wherein forming said lens patterns includes forming substantially flat lens patterns.

31. A method according to claim 26, further including forming cutting lines along which said lens patterns can be individually separated.

32. A method according to claim 31, further including forming a plurality of plugs in proximity to said cutting lines for electrical attachment to said coil assemblies, and filling said plugs with a conductive material.

33. A method according to claim 32, wherein forming said plugs includes shaping said plugs to prevent their detachment upon separation of said lens patterns along said cutting lines.

34. A method according to claim 26, further including selectively depositing reflective surfaces on said second side of said optical substrate.

35. A method according to claim 26 wherein forming said plurality of coil assemblies includes:

forming a flux gathering layer in said coil depressions;

forming an insulating layer on said flux gathering layer; and forming a layer of conductive coils on said insulating layer.

36. A method according to claim 26, further including lapping paid second side to a desired thickness to provide a desired focal plane.

37. A method according to claim 22, wherein said optical substrate is made of glass, and wherein forming said lens patterns and said coil depressions includes, heat pressing said glass substrate.

* * * * *